United States Patent [19]

Guy et al.

[11] Patent Number: 5,833,468
[45] Date of Patent: Nov. 10, 1998

[54] REMOTE LEARNING SYSTEM USING A TELEVISION SIGNAL AND A NETWORK CONNECTION

[75] Inventors: Frederick R. Guy, 500 S. Warren St., Syracuse, N.Y. 13202; Ronald N. Roberts, Cochecton, N.Y.

[73] Assignee: Frederick R. Guy, Syracuse, N.Y.

[21] Appl. No.: 590,640

[22] Filed: Jan. 24, 1996

[51] Int. Cl.⁶ .............................. G09B 3/00; G09B 5/08
[52] U.S. Cl. ................. 434/350; 434/118; 434/304 R; 434/362; 348/13; 345/302; 706/427; 379/102.01
[58] Field of Search .............................. 434/118, 307 R, 434/308, 323, 350, 351, 362, 365; 463/40–42; 395/761, 806.8, 7.92; 348/14, 7, 61, 552, 468, 460, 473, 484, 107, 10, 12, 13, 16, 17; 364/188; 379/88, 90.01, 93.01, 93.17, 93.19, 93.28, 100.01, 102.01; 707/500; 706/927; 345/302

[56] References Cited

U.S. PATENT DOCUMENTS

| | | |
|---|---|---|
| 4,415,774 | 11/1983 | Driver . |
| 4,715,818 | 12/1987 | Shapiro et al. . |
| 4,780,757 | 10/1988 | Bryer et al. .................................. 348/7 |
| 4,785,472 | 11/1988 | Shapiro . |
| 4,793,813 | 12/1988 | Bitzer et al. . |
| 4,837,800 | 6/1989 | Freeburg et al. . |
| 5,002,491 | 3/1991 | Abrahamson et al. ............. 434/350 X |
| 5,025,314 | 6/1991 | Tang et al. . |
| 5,176,520 | 1/1993 | Hamilton . |
| 5,192,999 | 3/1993 | Graczyk et al. ...................... 379/88 X |
| 5,200,822 | 4/1993 | Bronfin et al. ........................... 348/460 |
| 5,267,865 | 12/1993 | Lee et al. . |
| 5,283,638 | 2/1994 | Engberg et al. ................ 379/93.17 X |
| 5,295,836 | 3/1994 | Ryu et al. . |
| 5,303,042 | 4/1994 | Lewis et al. . |
| 5,310,349 | 5/1994 | Daniels et al. . |
| 5,318,450 | 6/1994 | Carver . |
| 5,375,160 | 12/1994 | Guidon et al. ............................. 379/52 |
| 5,385,475 | 1/1995 | Sudman et al. ..................... 434/350 X |
| 5,387,104 | 2/1995 | Corder ................................. 434/350 X |
| 5,458,494 | 10/1995 | Krohn et al. ........................ 434/350 X |
| 5,590,360 | 12/1996 | Edwards .............................. 434/350 X |

FOREIGN PATENT DOCUMENTS

| | | |
|---|---|---|
| 0 142 302 | 5/1985 | European Pat. Off. . |
| 0 366 250 | 5/1990 | European Pat. Off. . |
| WO 95/28804 | 10/1995 | WIPO . |

OTHER PUBLICATIONS

En Technology Corporate Backgrounder, pp. 1–3, Jun. 2, 1995.

"Linking Home Computer and TV," Malachi Lets TV Viewers Order Products, Data via Home Computer, pp. 1–3, 1995.

En Technology Publication, Malachi Fact Sheet, pp. 1–2, Oct. 12, 1995.

McGarvey, "Television: Data Delivery Swithces Channels," Inter@ctive Week, vol. 2, No. 11, Jun. 19, 1995.

Herbert, "PC Connection founders wed PC with TV," New Hampshire Business Review, vol. 17, No. 14, Jul. 7–20, 1995, pp. 1–2.

(List continued on next page.)

*Primary Examiner*—Joe Cheng
*Attorney, Agent, or Firm*—Finnegan, Henderson, Farabow, Garrett & Dunner, L.L.P.

[57] ABSTRACT

A remote learning system combines on-line service information and remote user information with a television signal designed to be received by students using multimedia personal computers. The combined signal is then transmitted to all of the students at their personal computers. At each personal computer, the received signal is separated into its component parts by a VBI modem for display or control on/of the personal computers. Each personal computer is capable of communicating back to a main server over a network such as a public telephone network. A broadcasting facility integrates the information transmitted over the network from a single student with the television signal.

19 Claims, 7 Drawing Sheets

OTHER PUBLICATIONS

En Technology's "TV Enhancement System," Communications Daily, vol. 15, No. 121, Friday, Jun. 23, 1995.

Bulkeley, "En Technology Inc's Device Would Rapidly Transmit Large File to PC–TV Link," The Wall Street Journal, Thursday, Jun. 15, 1995.

Carlile, "Tempe firm, Intel team up to send data via TV," The Arizona Republic, Saturday, May 6, 1995.

Magruder, "Skyway system' rides with TV signals to distribute data," Arizona Business Gazette, Jul. 13, 1995.

WavePhore Press Release, "Wavephore Develops Datacasting System for Television Azteca in Mexico," Aug. 8, 1995.

WavePhore Press Release, "Wavephore and Arizona State University Launch Distance Learning Service," Aug. 17, 1995.

WavePhore Press Release, "Wavephone and GEC Plessey Semiconductors Enter into Alliance for Multimedia Chipset Development," Oct. 5, 1995.

WavePhore Press Release, "Intel and Waveform Sign Technology and Investment Agreement," May 5, 1995.

WavePhore Press Release, "FCC Proposed to Allow Digital Data Transmission Within the Video Portion of TV Broadcasts, in Response to WavePhore's Request," Apr. 25, 1995.

Deagon, "Technology Offers TV Broadcasters an Avenue into Interactive Services," Invstor's Business Daily, Monday, Apr. 19, 1993.

WavePhore Press Release, "Wavephore and Belcom Sign Agreement to Co–Develop Russian Data Broadcasting System," Sep. 10, 1995.

Wave Phore Press Release, "Wavephore Unveils Windows–Based Wireless Multimedia Datacasting Software," Oct. 5, 1995.

Advertisement Brochure for TVT/4 Video Broadcast Modem, 1994, five pages.

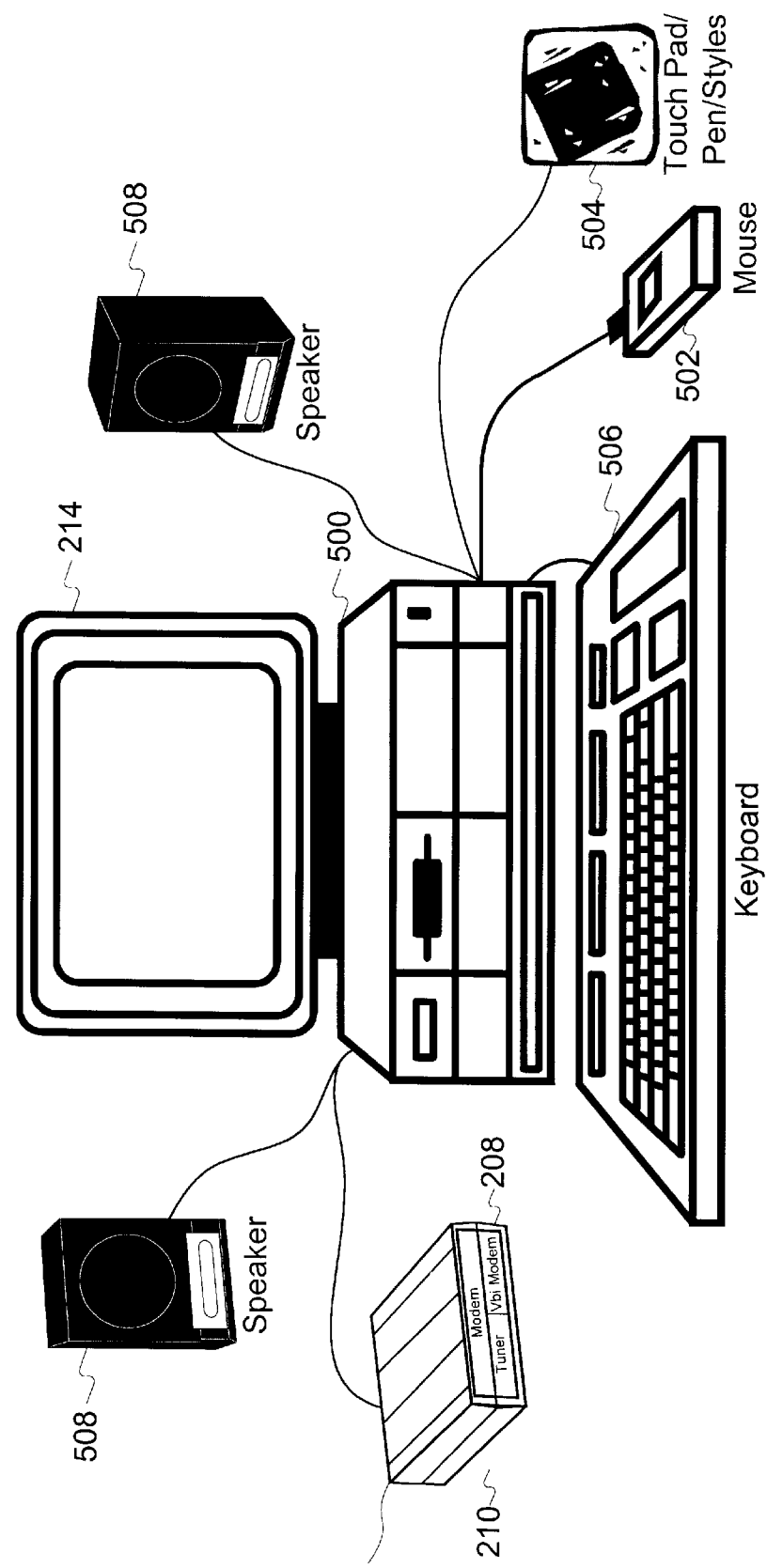

REMOTE LEARNING SYSTEM USING A TELEVISION SIGNAL AND A NETWORK CONNECTION

BACKGROUND OF THE INVENTION

1. Field of the Invention

The present invention describes a system which permits an instructor to teach one or more students at a site remote from the instructor.

2. Description of the Related Art

Instruction of students located in the same physical classroom as the instructor is an effective method of teaching because it allows a student to ask questions to both the instructor and the rest of her classmates. The instructor can give an immediate answer to the students, and can spontaneously ask additional questions of the students as the lecture progresses. In short, the instructor and the students can easily interact with each other concerning the topic of the lecture.

However, it is often necessary or desirable to teach students who for some reason are not able to meet in the same physical classroom. For example, students or instructors located at disparate physical locations may not be able to meet in one location or the number of students may be so large as to preclude fitting comfortably into one classroom. In these situations, distant or remote learning systems can advantageously be employed.

One approach to teaching students at remote sites, disclosed in U.S. Pat. No. 4,785,472, involves connecting a teaching station with a plurality of student stations over telephone lines. Both the teacher and the students have a prerecorded instructional tape and a video player to play the tape on. In operation, the instructor lectures, sends data to a computer, and controls on/off synchronization of the video players with commands sent over the telephone lines. In this manner, the instructor is able to lecture and periodically visually illustrate the lecture by showing the same section of multiple, identical video tapes to all of the students. This approach to remote learning has significant limitations caused by a need for (1) a constant telephone connection to the teaching site; (2) video segments for each session; and (3) a prepared video tape that must be distributed to each student before the lesson begins. Each of these requirements for a conventional remote learning system has associated costs, the most significant of which may be the telephone connection that must be connected for the complete lesson.

Another conventional approach to remote learning is to use personal computers outfitted with a modem such that all communication is over public telephone lines. This approach is initially advantageous because the setup cost is low; once in use, however, the phone connect time charges can be prohibitively expensive.

Additionally, it is presently difficult to send video signals with the limited bandwidth available with today's telephone lines and modems. Further, proposals to use wide bandwidth telephone lines for such video transmission will increase further the costs required to use such proposed systems.

SUMMARY OF THE INVENTION

It is therefore an object of the present invention to address the limitations of the prior art remote learning systems. It is a further object of the present invention to provide a remote educational system that provides a visual and, when appropriate, audio presentation, for students, including, for example, pictures of the instructor while allowing the students to easily interact with the instructor and with each other.

It is a further object of the present invention to provide a remote educational system that is low in cost for the student, both in terms of the initial hardware and software required and in the day-to-day operation.

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims. To attain the advantages and in accordance with the purpose of the invention, as embodied and broadly described herein, the invention comprises a system for remote communication between a host and a client, comprising a host facility for integrating data to be supplied to the client into vertical blanking intervals of a television signal and broadcasting the integrated television signal. A client receives the broadcasted integrated television signal and separates the integrated television signal into a standard television signal and the to-be-supplied data. Finally, the client transmits information to the host facility by connecting to a network linked with the host facility.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the invention and together with the description, serve to explain the principles of the invention. In the drawings.

FIG. 5 illustrates one of the multimedia PCs used in an embodiment of the present invention.

Reference will now be made in detail to the present preferred embodiment of the invention, an example of which is illustrated in the accompanying drawings. Wherever possible, the same reference numbers will be used throughout the drawings to refer to the same or like parts.

DESCRIPTION OF THE PREFERRED EMBODIMENT

A remote, or distance learning system is disclosed which combines on-line service information with a television signal designed to be received by students using a multimedia personal computer. Each personal computer is capable of communicating back to a server over a network, such as a public telephone network. The broadcasting facility then integrates the information transmitted over the network from a single student with the television signal, such that all the personal computer users (e.g., students) can see the information without having to connect to the network. The server may also integrate information originating at the server for transmittal to the students' personal computers.

Figure 1:
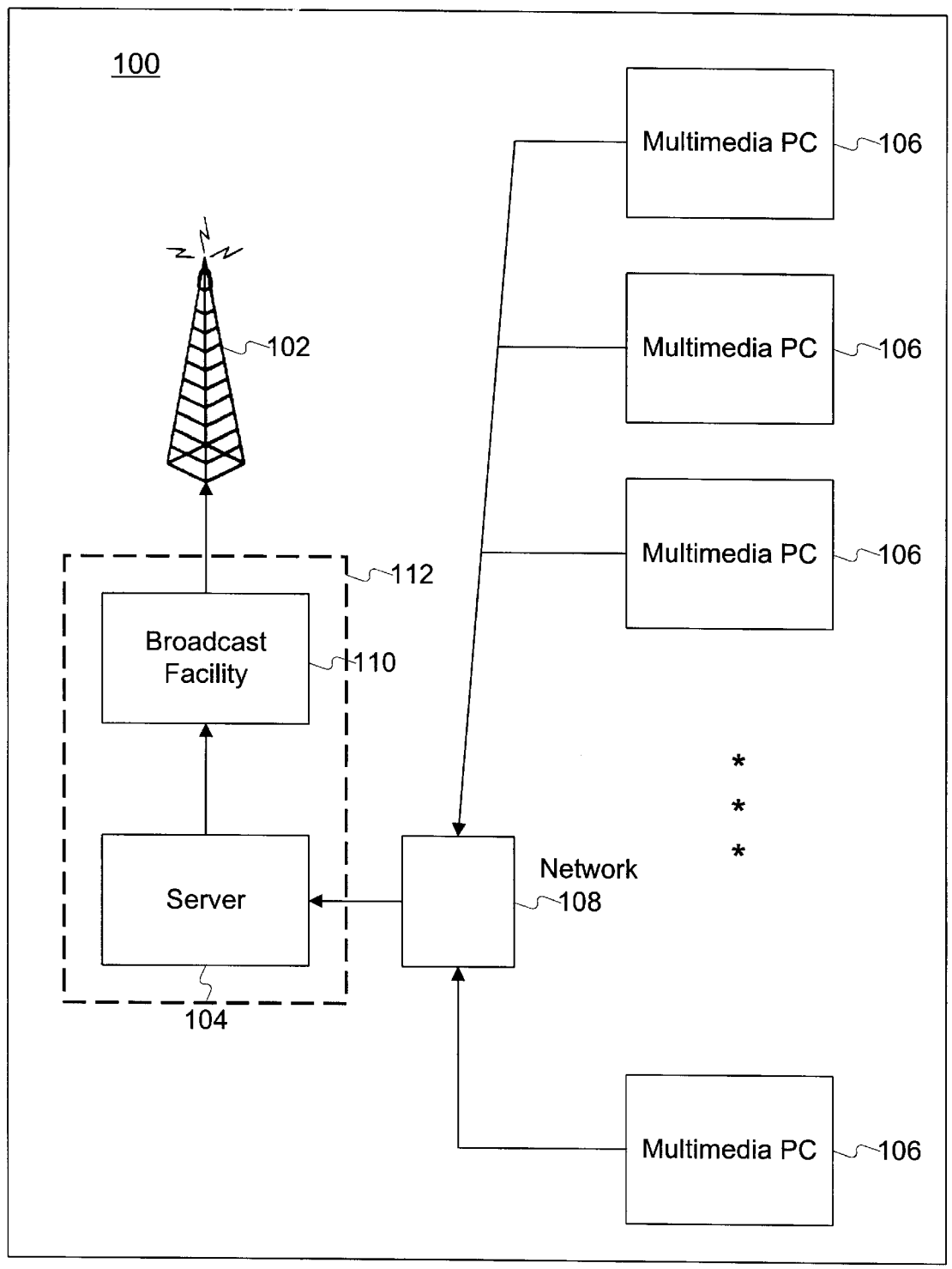
FIG. 1 is an illustration of the distance learning system according to an embodiment of the present invention.

In FIG. 1, the distance learning system (DLS) 100 according to the preferred embodiment comprises a broadcasting antenna 102 for broadcasting information, such as an instructional presentation, to a plurality of multimedia personal computers (PCs) 106 located at sites distant from the antenna 102. The antenna 102 could equivalently be replaced by a cable television link. A broadcasting facility 110, and server 104 are coupled to the antenna 102 and generate the signals to be broadcast by the antenna 102. A network 108, such as a public telephone network, is used to transmit data between the PCs 106 ("clients") and the server 104. Although in the preferred embodiment the network 108 is a public telephone network, it could equivalently be any wide area network or combination thereof.

Figure 2:
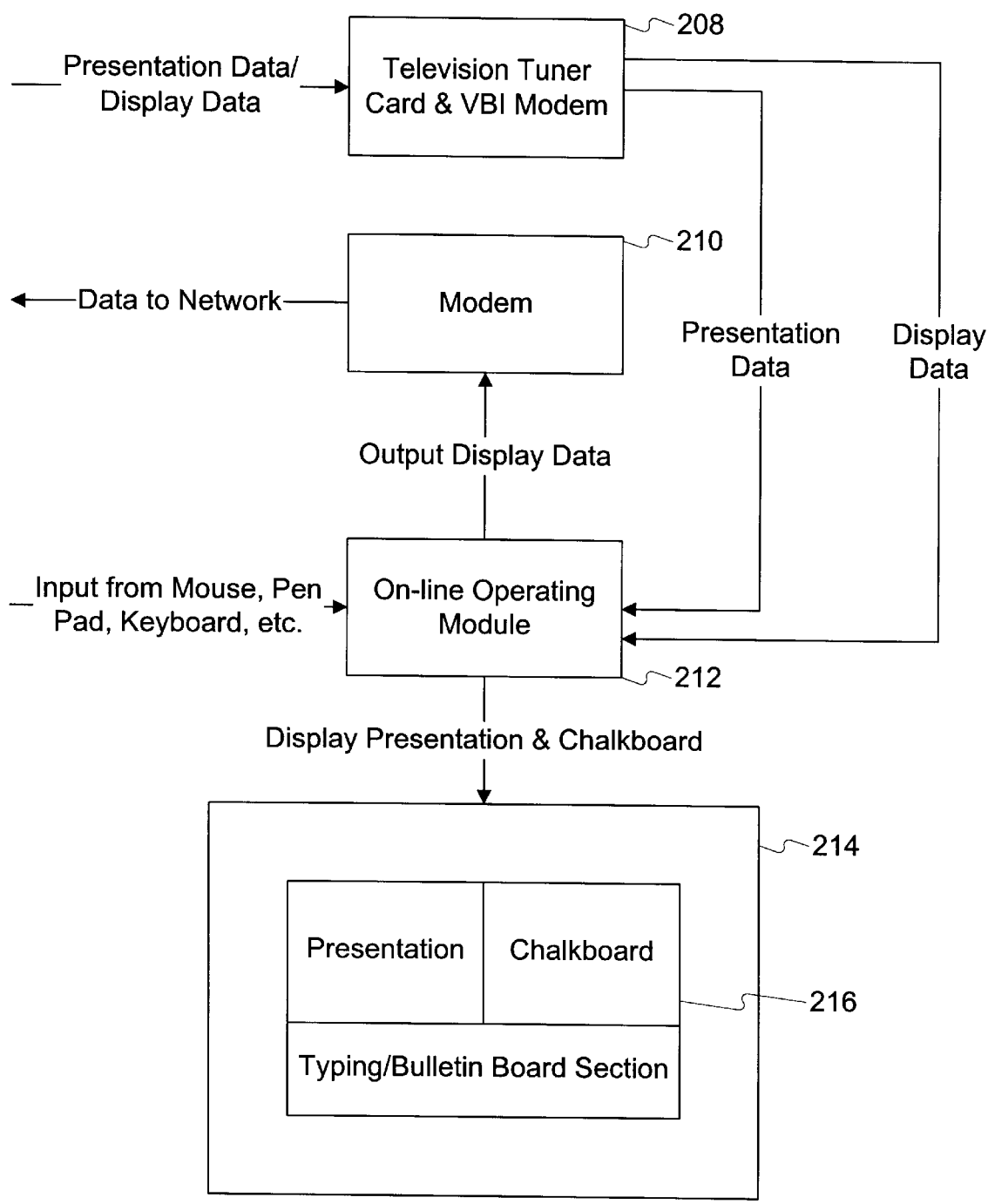
FIG. 2 is a block diagram of an exemplary multimedia PC as used in an embodiment of the present invention.

Reference will now be made to FIG. 2 to describe an exemplary embodiment of one of the PCs 106. Television tuner card/vertical blanking interval (VBI) modem 208 receives the television signal transmitted from the antenna 102. The television tuner card/VBI modem 208 may preferably be any of a number of suitable commercially available products, such as, for example, the Malachi, manufactured by En Technology Corporation. The television signal received at the tuner card/VBI modem 208 is provided to the on-line operating module 212 as presentation data and display data. Presentation data is the real-time audio-video data recorded by the instructor whereas display data is data that, for example, defines actions of the students. The on-line operating module 212 controls a modem 210 and display area 216 of the PC's monitor 214. Further, the on-line operating module 212 manages information input from the user of PC 106 using input devices such as a mouse, a pen writing tablet, or a keyboard.

FIG. 5 illustrates an exemplary one of the multimedia PCs 106. In the preferred embodiment, PC 106 is a multimedia personal computer operating with the 80×86 compatible architecture and a graphical or windows based operating system. However, as would be recognized by one of ordinary skill in the art, many other suitable computer architectures and operating systems could be equivalently used.

PC housing 500 of PC 106 holds the majority of the PC's operating hardware. Housing 500 may hold, for example, the main processor, a hard disk drive, a floppy disk drive, fast access volatile memory, and CD ROM drive. Either connected to or integrated within housing 500 are a variety of input devices such as keyboard 506, mouse 502, and touch pad or pen writing tablet 504. PC 106 may also include speakers 508 and monitor 214, used to output audio and visual information, respectively. Modem 210, for sending or receiving digital data over phone lines, is electrically connected to housing 500. Television tuner/VBI modem 208, for receiving a modified standard television signal, is also electrically connected to housing 500. Both modem 210 and tuner/VBI modem 208 may alternately be implemented as computer (or printed circuit) boards installed within the housing 500.

The invention will be further clarified by the following operational description, which is intended to be exemplary of the invention. In a typical remote learning session according to the present invention, an instructor, located at the host site 112, teaches students, each located at one of the PCs 106. The lecture information in the form of an audio-visual feed from the instructor, called presentation data, is broadcast through a television signal by antenna 102 to the PCs 106. In addition to the presentation data, data to be used to control the on-line operating module 212, called display data, is embedded within the television signal being broadcast to the PCs 106. Frequently, the display data describes updates to be made to the students' displays.

Figure 3:
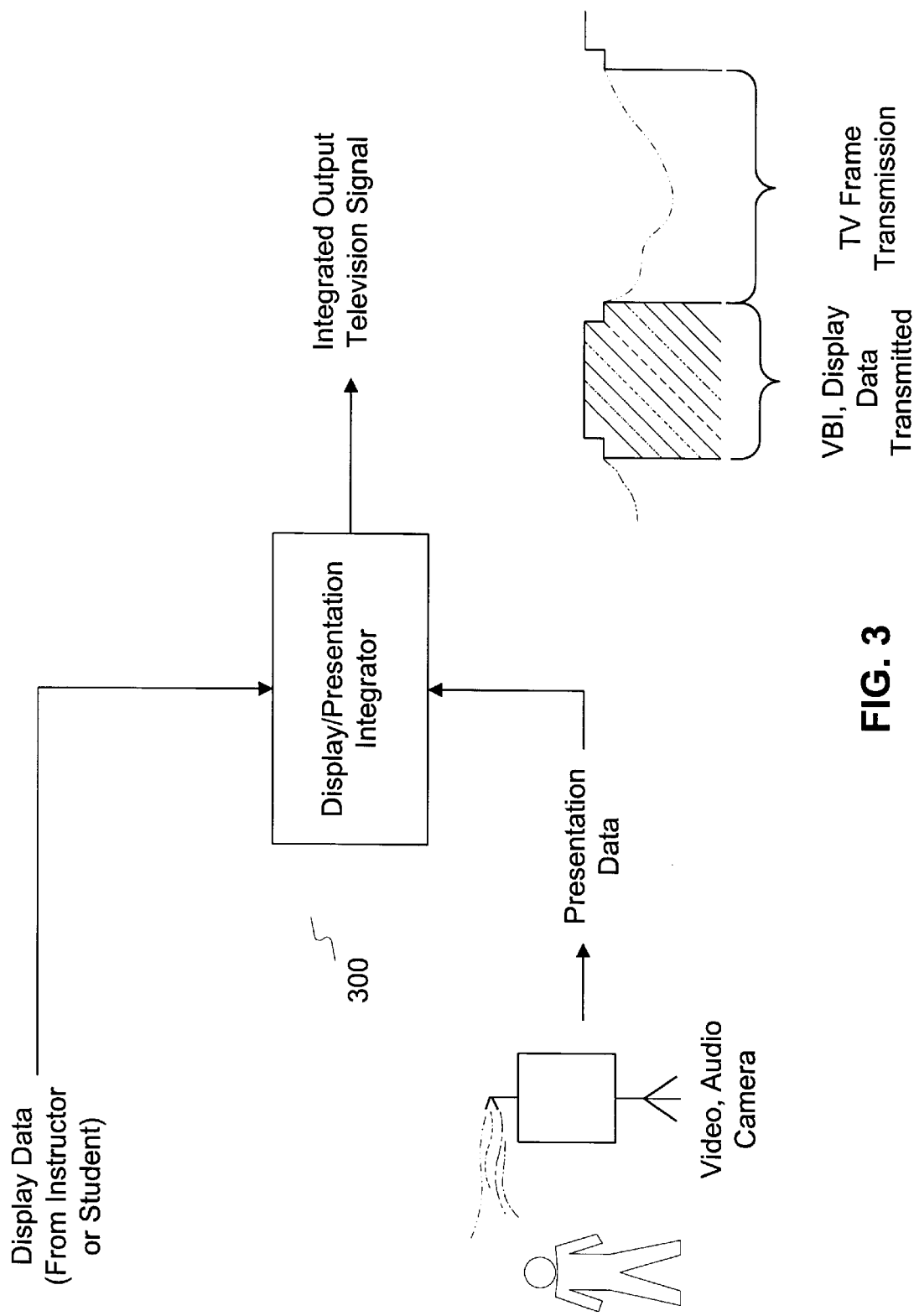
FIG. 3 is a diagram illustrating the integration of the display data and presentation data according to an embodiment of the present invention.

FIG. 3 illustrates the integration function of the presentation data with the display data, performed at the host 112. Presentation data to be integrated may include a live or taped audio-visual feed of the lecture. Display data to be integrated may include data entered by either the instructor or one of the students. Display data entered by a student is transmitted to the host 112 through network 108 using the student's modem 210 before it is integrated. The actual integration operation is performed by integrator 300, which receives the display data and presentation data and integrates them into a single output signal 302. The output signal 302 comprises a standard television signal of the presentation data modified by inserting the display data into the television signal's vertical blanking intervals. The output signal 302 is transmitted to the broadcasting facility 110 and antenna 102 for broadcasting to the PCs 106.

All the display data at the server does not have to be integrated by the integrator 300. Optionally, if the server is to send data to only one, or only a few students, and a live modem connection exists between those students, the server may send the display data directly over the live modem connection.

At each PC 106, tuner card/VBI modem 208 receives the transmitted output signal 302 and reads the display data from the vertical blanking interval of the television signal. The separated presentation and display data signals are then transferred to the on-line operating module 212.

The on-line operating module 212 manages the user interface 216 and transfers the output display data over modem 210 to server 104 via network 108. A typical display on the user interface 216 is shown in more detail in FIG. 4. The operation of the on-line operating module 212 in relation to FIG. 4 will be described next.

Figure 4:
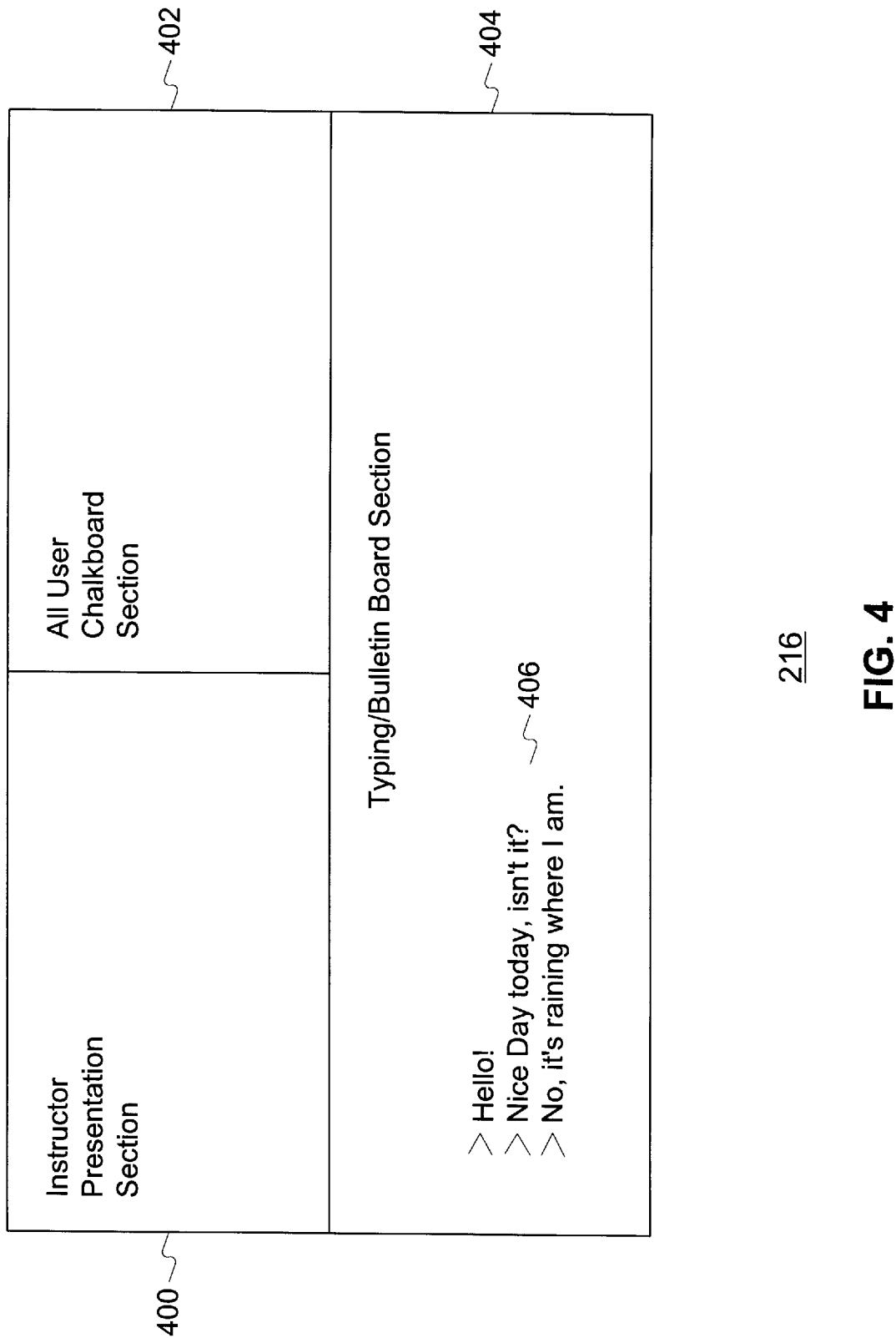
FIG. 4 is an exemplary display of the user interface presented by the software according to an embodiment of the present invention.

FIG. 4 is an exemplary display of the interface screen presented by the on-line operating module 212 to the user. A similar interface screen would be presented to the instructor at the host 112. The three main sections of the interface screen are the instructor presentation section 400, the chalkboard section 402, and the typing/bulletin board section 404.

In the instructor presentation section 400, a real-time rendering of the television presentation data is displayed. Typically, this would be a display of the instructor and/or his instructional materials during a lecture. An audio signal corresponding to the instructor's presentation may be simultaneously output to the speakers 508. The chalkboard section 402 is an interactive chalkboard that can be written on by either the instructor or the students. Typically, a computer mouse, touch pad, and/or pen writing pad is used to write on the chalkboard 402. Information written on the chalkboard 402 by the instructor is integrated into the television signal as display data at the host 212, by the integrator 300, and transmitted to the PCs 106, where it is subsequently separated by the tuner card/VBI modem 208 from the television signal and displayed on the students' chalkboards 402.

Figure 6A:
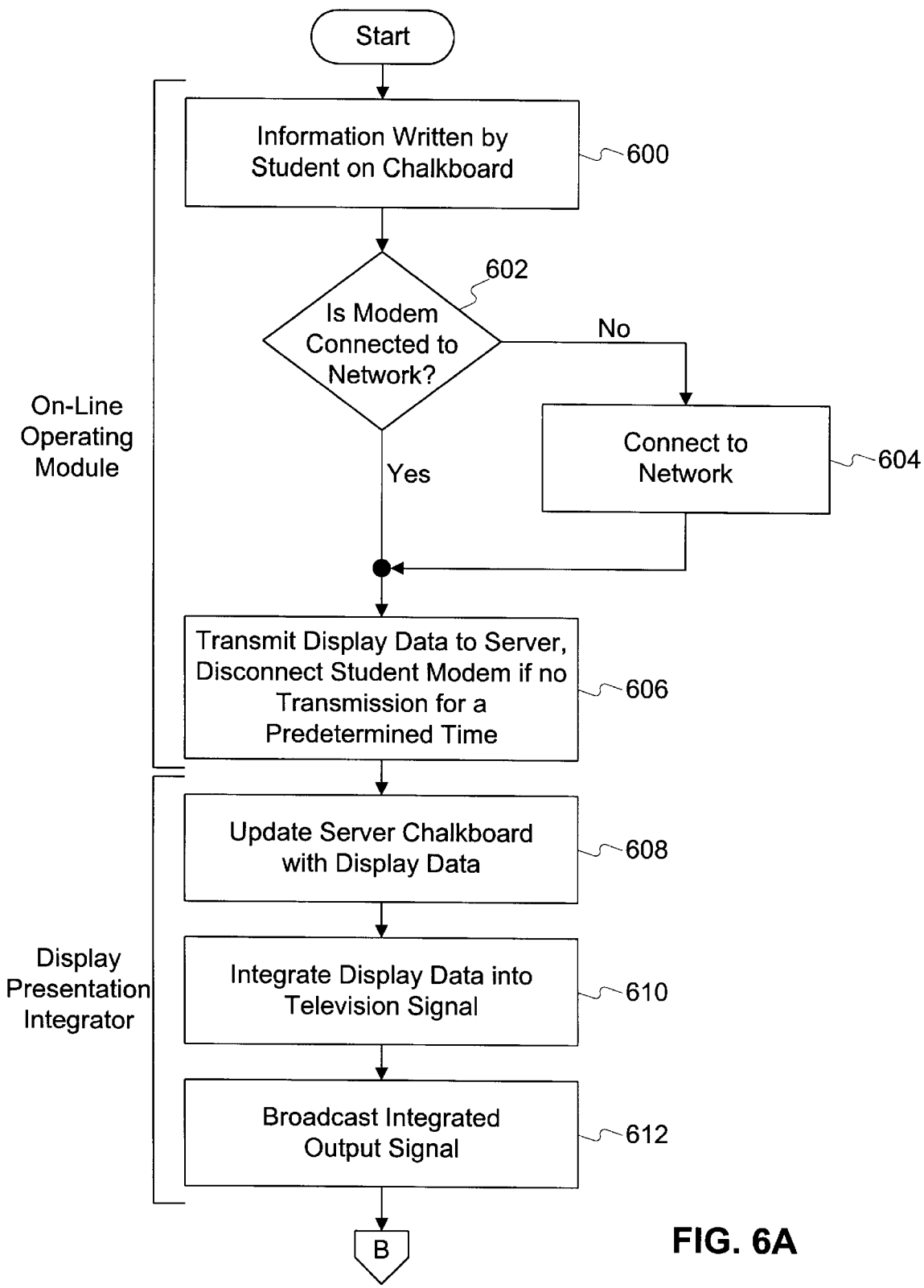
FIGS. 6A and 6B are a flow chart illustrating the system operation according to an embodiment of the present invention.
Figure 6B:
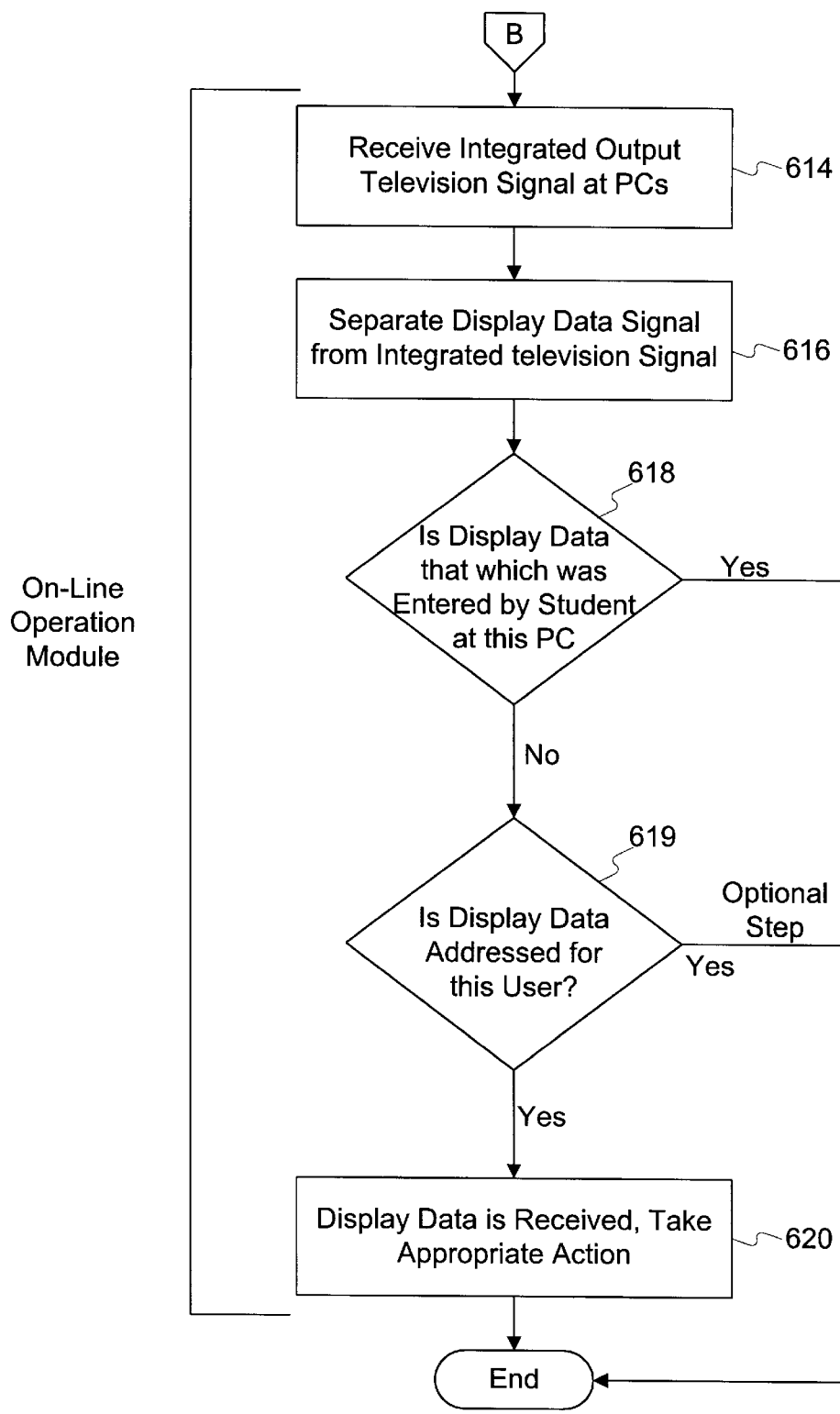

A flow chart of the decision sequence initiated when a student writes information to her chalkboard 402 for viewing by the instructor and the other students is shown in FIG. 6. When information is written on the chalkboard by the student, step 600, it is transmitted as display data by the student's modem 210 to the server 104 in step 606. If in step 602 it is determined that the modem is not connected to the public telephone network, step 604 is executed, connecting the modem 210 to the network. If a predetermined period of time elapses with no transmission by the modem and the software is in a "toll-saving" mode, modem 210 will automatically be disconnected from the telephone network. In the "toll-saving" mode, connections to the server are temporary and end after a predetermined period of time. If a connection has been ended and the student subsequently performs actions which require connection to the server, the client program transparently re-establishes the connection.

In step 608, the display data received by the server is written onto the server chalkboard. Next, the display data is integrated with the instructor television signal, step 610, and the integrated output signal 302 is broadcast, step 612. The integrated output signal 302 is then received at the students' PCs, step 614, and separated by the tuner/VBI modem 512 in step 616. The separated display data is received by the on-line operating module 212. Finally, the on-line operating module 212 judges whether the display data is the same display data that was previously entered and transmitted from the host PC. If it is not the same display data, the chalkboard 402 is updated with this new display data in step 620. If it is the same display data, the chalkboard 402 is not updated.

Although the above example was illustrated using a general broadcast of the display data, that is, the display data was received and displayed on all the PCs 106, more selective broadcasting functions can be utilized. In particular, the student or instructor writing on the chalkboard may elect for her message to be displayed on only a selected set of the other PCs. To do this, the user selects, preferably using a menu system, whom her message is to be sent to. This selection information is transmitted with the display data. At the receiving PC, an additional judgment is made at step 619, namely, the PC determines whether the message was addressed for display to that particular user. If it is determined that it was intended for that user, the message is displayed, otherwise, the message is ignored by the on-line operating module 212.

Typing/bulletin board section 216 of the user interface is used by the students and the instructor as an interactive "chat" area in which messages can be quickly typed and transmitted to other users. Here, after a line of text 406 is entered by a student or the instructor, it is converted into display data by the on-line operating module 212 and transmitted to the other users in the same manner that information entered on the chalkboard is transmitted. That is, the text is transmitted to the host 112, integrated into the television signal by the integrator 300, and broadcast to the PCs 106. Similar to the chalkboard information, a user may also address the messages sent to a limited set of users, allowing for more personal messages.

It will be apparent to those skilled in the art that various modifications and variations can be made in the embodiment of the present invention and in construction of this invention without departing from the scope or spirit of the invention. As an example, the disclosed invention is not limited to remote classroom instruction with an instructor lecturing to students. Indeed, a bulletin board and on-line service has been constructed using the concepts disclosed in the present invention. The bulletin board and on-line service transmits most of the general bulletin board data to the users using a high bandwidth, low reception cost signal such as a television signal. The users transmit their data using a lower bandwidth network such a public telephone network. Although all the users receive a single transmission signal from the bulletin board, the user's local software only displays the information intended for that user.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A system for remote communication, comprising:
   a host facility for integrating data into vertical blanking intervals of a television signal and broadcasting the integrated television signal; and
   a client for receiving the broadcasted integrated television signal and for separating the integrated television signal into a standard television signal and to-be-supplied data;
   wherein the client transmits information to the host facility by connecting to a network linked with the host facility and the client connects to the network only when the information is present at the client and disconnects from the network when the information has been transmitted to the host, whereby the amount of time spent on the network is reduced.

2. The system of claim 1, wherein the disconnecting occurs after a predetermined time of inactivity after the information has been transmitted to the host.

3. The system of claim 2, wherein the network is a public telephone network.

4. The system of claim 3, wherein the client connects to the public telephone network with a modem.

5. The system of claim 2, wherein the network is a wide area network.

6. The system of claim 2, wherein the client further comprises a tuner card for separating the integrated television signal.

7. The system of claim 6, wherein the client further comprises a monitor for displaying a representation of the television signal and the to-be-supplied data in separate areas of the monitor.

8. An interactive system for remote educational instruction between an instructor and a plurality of students, the system comprising:
   a host facility for integrating a continuous signal of images and sounds with a digital data signal into a television signal, the host facility broadcasting the television signal and receiving data defining actions of the plurality of students;
   a plurality of remote multimedia computers each comprising:
      a television tuner card for receiving the television signal and converting the television signal into a digital video signal for display on a first section of a monitor of the computer, an audio signal for transmission to a speaker of the computer, and the digital data signal, at least part of the digital data signal being sent for display on a second section of the monitor;
      a modem for transmitting the data defining actions of a student to the host broadcasting facility over public phone lines;
   wherein the host facility receives the data defining actions of the students from at least one of the plurality of multimedia computers and converts the data defining actions of the students into the digital data signal for subsequent integration into the television signal and broadcasting of the television signal.

9. The remote education system of claim 8, wherein when a first of the multimedia computers receives digital data corresponding to the data defining student actions transmitted from the modem of the first multimedia computer, the first multimedia computer cancels the sending for display to the second section of the monitor.

10. The remote education system of claim 8, wherein the continuous signal of images and sounds represents a presentation of the instructor.

11. The remote education system of claim 8, wherein the host receives the data defining actions of the plurality of students over public phone lines.

12. A method for remote communication between a host facility and a plurality of client facilities, the method comprising:

broadcasting a signal compatible with a television signal at the host facility to the plurality of client facilities;

continuously receiving the television compatible signal at the plurality of client facilities, the television compatible signal containing data defining actions of at least one of the client facilities;

wherein each of the client facilities connects to a network to transmit to the host facility when the data defining the client actions is present at each said client facility, and disconnecting from the network when the data defining the client actions at each said facility has been transmitted to the host facility.

13. The method of claim 12, wherein the network is a public telephone network.

14. The method of claim 12, wherein the network is a wide area network.

15. The method of claim 12, wherein the television signal is broadcast over cable television lines.

16. The method of claim 12, wherein the television signal is broadcast through the atmosphere.

17. A method for remote communication between a host facility broadcasting a signal compatible with a television signal and a plurality of client facilities, the method comprising:

continuously receiving the television compatible signal at the plurality of client facilities, the television compatible signal containing first data defining actions of at least one of the client facilities;

connecting each of the client facilities to a network to transmit to the host facility when second data originating at said client facility and defining actions at said client facility is present at said client facility, and disconnecting from the network when the second data defining actions at said client facility has been transmitted to the host facility.

18. A method for remote communication between a host facility and a client facility, the client facility having a multimedia computer including a television tuner card and a modem, the method comprising the steps of:

receiving a first data signal at the host facility, the first data signal being transmitted by the client facility's modem and defining actions of the client facility;

generating a second data signal at the host facility, the second data signal being compatible with a television signal and representing an educational presentation by an instructor;

generating a third data signal at the host facility, the third data signal defining control instructions for the client facility;

integrating said first data signal, said second data signal, and said third date signal at said host facility such that said integrated signal is compatible with a television signal;

transmitting said integrated signal to said tuner card of the client facility.

19. A method for running an on-line bulletin board between a host and a plurality of client facilities, the method comprising:

continuously transmitting a television compatible signal to the plurality of client facilities, the television compatible signal containing first data defining information intended for all of the plurality of client facilities, and second data defining information specific to selected ones of the plurality of client facilities;

intermittently receiving third data from the plurality of client facilities defining actions at said client facilities;

integrating a portion of the received third data into the television compatible signal as one of the first data and the second data for transmission to the plurality of client facilities.

* * * * *